No. 762,947. PATENTED JUNE 21, 1904.
A. M. SAUNDERS.
SCREW THREADING DIE.
APPLICATION FILED JAN. 31, 1903.
NO MODEL.
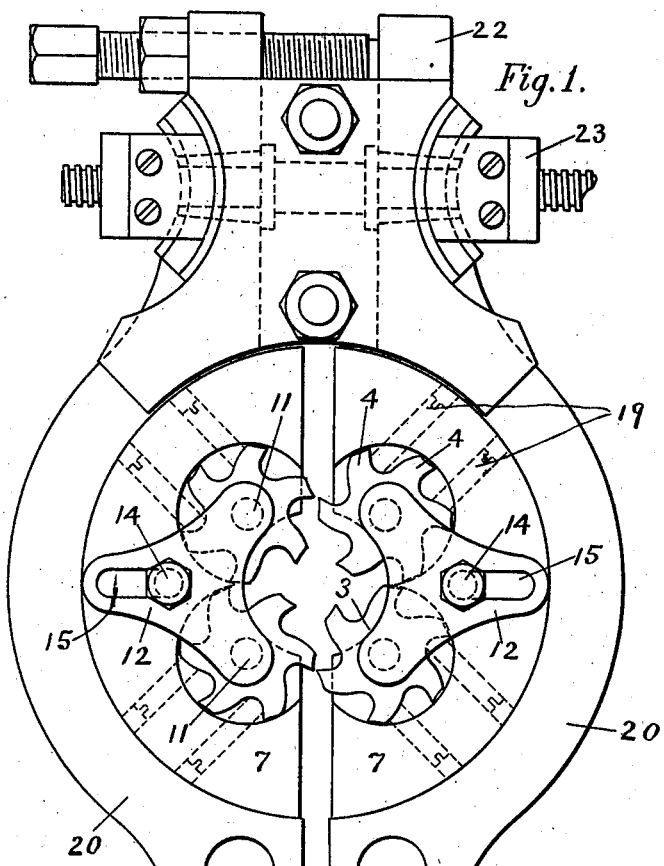
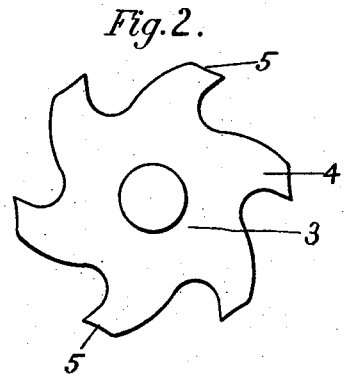
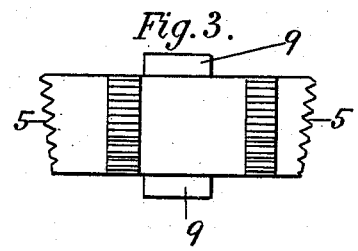
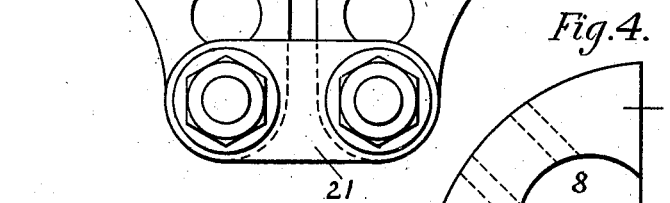
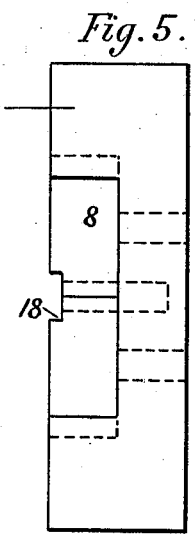
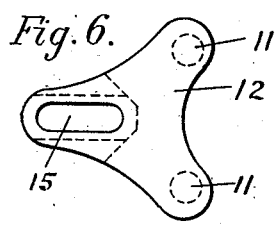
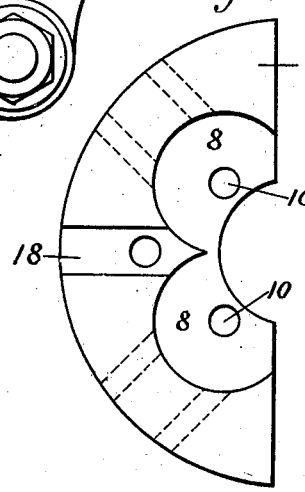
Witnesses.
Inventor:
Augustus M. Saunders
By Kay & Totten
—Attorneys.

No. 762,947. Patented June 21, 1904.

UNITED STATES PATENT OFFICE.

AUGUSTUS M. SAUNDERS, OF McKEESPORT, PENNSYLVANIA, ASSIGNOR TO NATIONAL TUBE COMPANY, OF PITTSBURG, PENNSYLVANIA, A CORPORATION OF NEW JERSEY.

SCREW-THREADING DIE.

SPECIFICATION forming part of Letters Patent No. 762,947, dated June 21, 1904.

Application filed January 31, 1903. Serial No. 141,274. (No model.)

*To all whom it may concern:*

Be it known that I, AUGUSTUS M. SAUNDERS, a resident of McKeesport, in the county of Allegheny and State of Pennsylvania, have invented a new and useful Improvement in Screw-Threading Dies; and I do hereby declare the following to be a full, clear, and exact description thereof.

My invention relates to screw-cutting dies or chasing-cutters; and its object is to provide a die having a plurality of cutting-faces and so mounted in the die holder or stock that when one of the cutting-faces breaks or chips off another can be quickly turned into position, and thus obviate the loss of time necessary to remove the entire die-rings and dies and replace them by new ones.

In screw-cutting machines there are usually a number of cutters or die-teeth mounted in a holder or chuck and which operate simultaneously upon the tube, rod, or other article being threaded. These dies or cutters are usually held in blocks or "rings," as they are called, and the latter in turn are held in the chuck or stock, the latter being either rigidly connected to the frame of the machine and the stock-rod rotated, or else being secured to the spindle of the lathe and the stock-rod held stationary. In case the cutting edge of any of the die-teeth breaks or clips off, as frequently occurs in the use of threading-machines, it is necessary to take out the dies and frequently the entire rings or blocks and replace the dies with new ones. If the dies have only one cutting-face, this requires considerable time and correspondingly decreases the output of the machine.

The object of my invention is to provide threading-dies and die-holders so constructed that the dies can be accurately adjusted to position, and in case of breakage a new cutting-face can be quickly brought into position, thus obviating the loss of time occurring with the old construction.

To this end it comprises a die or chasing-cutter having a plurality of radial arms with threaded cutting edges on the end of each arm and rotatably mounting such dies in the blocks or rings and providing adjustable means for holding them immovably, but which will permit of the rotation of the dies to bring a new cutting-face into position.

In the accompanying drawings, Figure 1 is a face view of the chuck or stock of a screw-cutting machine provided with my improved dies. Fig. 2 is a face view of one of the dies. Fig. 3 is an edge view of the same. Fig. 4 is a plan view of one of the holding blocks or rings. Fig. 5 is an edge view of the same. Fig. 6 is a face view of the steady-rest, and Fig. 7 is an edge view of the same.

My improved dies are made as shown in Figs. 1 and 3 and comprise bodies 3, having a plurality of radially-disposed arms 4. Each of these arms is provided on its end with a threaded cutting-face 5, which is cleared away from the point to the heel and the threads of which gradually increase in depth from one side to the other thereof, as shown in Fig. 3, all of which is common in threading-dies and chasing-cutters. The radial arms are preferably formed with curved forward and rear faces, as shown in Fig. 2, to give them a greater resistance against the thrust imposed thereupon while cutting and to provide clearance for the cutting edges. Any number of radial arms may be formed on the die, depending upon the size of the die and conditions of the holders. These dies are mounted in the holders or blocks 7, so as to be rotatable therein. These holders are or may be semicircular in shape, as shown in Fig. 1, and each is provided with a pair of depressions 8, forming seats for a pair of dies. The dies are rotatably mounted in these seats, preferably by providing the dies with trunnions 9 on their opposite faces, one of which fits in a hole or recess 10 in the block 7, while the other fits in a corresponding hole or recess 11 in the steady-rest 12. The latter is formed practically triangular, so as to hold the dies rigidly in position, having two arms, each of which extends over a cutter 3, located in a depression 8 of the block 7 and being secured to the block 7 by means of a bolt 14, extending through a slot 15 in the steady-rest. The slot permits the steady-rest to be swung out of the way, so that the dies can be easily or quickly removed, if necessary. To hold the steady-rest in position, it is provided on its lower face with a rib or projection 17, which fits into a groove 18, cut in the outer face of the holder 7.

To hold the dies against rotation while cutting, I provide a pair of steadying-screws 19, tapped through holes formed in the block 7 and bearing against the arms 4 of the cutters. By means of these screws the cutters can be adjusted to exactly the right position and then held immovable. Should the cutting-face of any of the dies break or become chipped off, it is merely necessary to loosen the bolt 14, turn the steady-rest out of the way, remove the die, and replace it in such position as to bring a new cutting-face into proper position and without altering the adjustment of the screws, as one setting of the screws answers for all cutting edges. This requires very little time.

The blocks or holders 7 will be held in any suitable stock or chuck, such as shown in Fig. 1, the same comprising a pair of semicircular members 20, connected at one end by a link 21 and at their opposite ends provided with outwardly-projecting arms 22, which may be forced together by any suitable means, such as the screw-clamp 23 shown. Any other form of stock or chuck, however, may be employed.

It will be observed that each of my dies comprises practically six separate cutters or chasing-tools, and the life of each die is practically that of six individual cutters. By merely loosening the steady-rest the dies can be turned around so as to bring another cutting-face into operative position, thus saving a great deal of time in case of breakage while at work. The dies can be used until all of the working faces are broken or chipped off before they need be reground. Furthermore, the tempering of a single cutter practically produces six cutters, so that a saving in the manufacture is effected.

What I claim as my invention, and desire to secure by Letters Patent, is—

1. A screw-threading die comprising a multiple chasing-cutter having a body provided with a plurality of radial arms and thread-cutting edges formed on the end of each arm, a holder provided with a recess open on one side in which said cutter is rotatably mounted, and an adjustable abutment projecting into the recess and lying in the same plane as the cutter and arranged to contact with the side of one of the arms thereof and hold the same against rotation.

2. A threading-die comprising a holder having a pair of recesses formed in one face thereof, a multiple chasing-cutter rotatably mounted in each recess, each cutter comprising a body having a plurality of radial arms with cutting edges formed thereon, and a steady-rest secured to said holder and projecting over said cutters and engaging the same centrally.

3. A screw-threading die comprising a holder having a pair of recesses formed therein, a steady-rest secured to said holder by a rib-and-groove connection and projecting over said recesses, and a pair of cutters mounted in said recesses and journaled in said holder and steady-rest, each of said cutters comprising a body having a plurality of radial arms each provided with threaded cutting edges, and means for holding said cutters against rotation.

In testimony whereof I, the said AUGUSTUS M. SAUNDERS, have hereunto set my hand.

AUGUSTUS M. SAUNDERS.

Witnesses:
   E. P. COREY,
   J. A. CAUGHEY.